(12) United States Patent
Adams

(10) Patent No.: US 7,897,115 B2
(45) Date of Patent: Mar. 1, 2011

(54) LOOP REACTOR FOR EMULSION POLYMERISATION

(75) Inventor: David Charles Adams, Darwen (GB)

(73) Assignee: Crown Brands Limited, Lancashire (GB)

( * ) Notice: Subject to any disclaimer, the term of this patent is extended or adjusted under 35 U.S.C. 154(b) by 914 days.

(21) Appl. No.: 11/666,974

(22) PCT Filed: Oct. 28, 2005

(86) PCT No.: PCT/EP2005/055619

§ 371 (c)(1),
(2), (4) Date: Jun. 28, 2007

(87) PCT Pub. No.: WO2006/048407

PCT Pub. Date: May 11, 2006

(65) Prior Publication Data
US 2007/0258868 A1 Nov. 8, 2007

(30) Foreign Application Priority Data
Nov. 2, 2004 (EP) .................................. 04256745

(51) Int. Cl.
*B01J 19/18* (2006.01)
*B08B 9/053* (2006.01)
*B08B 9/055* (2006.01)

(52) U.S. Cl. .................. 422/132; 422/135; 15/104.061; 15/104.062

(58) Field of Classification Search ................. 422/132, 422/135; 15/104.061, 104.062
See application file for complete search history.

(56) References Cited

U.S. PATENT DOCUMENTS

| 2,589,170 | A | * | 3/1952 | Nooy ..................... 15/104.062 |
| 3,682,186 | A | | 8/1972 | Howe |
| 4,515,287 | A | | 5/1985 | Baudoux et al. |

(Continued)

FOREIGN PATENT DOCUMENTS

DE 32 33 557 3/1984

(Continued)

OTHER PUBLICATIONS

International Search Report, PCT International Application No. PCT/EP2005/055619, Mar. 1, 2006.

(Continued)

*Primary Examiner*—Jennifer A Leung
(74) *Attorney, Agent, or Firm*—Kenyon & Kenyon LLP

(57) ABSTRACT

A polymerisation reactor (1) comprising a circulation loop (2), an inlet for raw material (3), an outlet (5), driving means for (6) circulating a reactor charge within the circulation loop (2), and a pig station (7) for storing, launching, and receiving cleaning pigs. The pig station (7) comprises a lid to cover an opening enabling removal of the cleaning pig. The pig station (7) is constructed as a box with a cylindrical bore connected at both ends to the circulation loop, the bore having a central part with a diameter which is larger than the inner diameter of the circulation loop. At a transitional part at the outer ends of the bore the bore diameter narrows down to be substantially equal to the inner tube diameter of the circulation vloop. Over at least a part of the inner bore substantially half of the circular cross-section is formed in the removable lid.

14 Claims, 5 Drawing Sheets

U.S. PATENT DOCUMENTS

Figure 1:
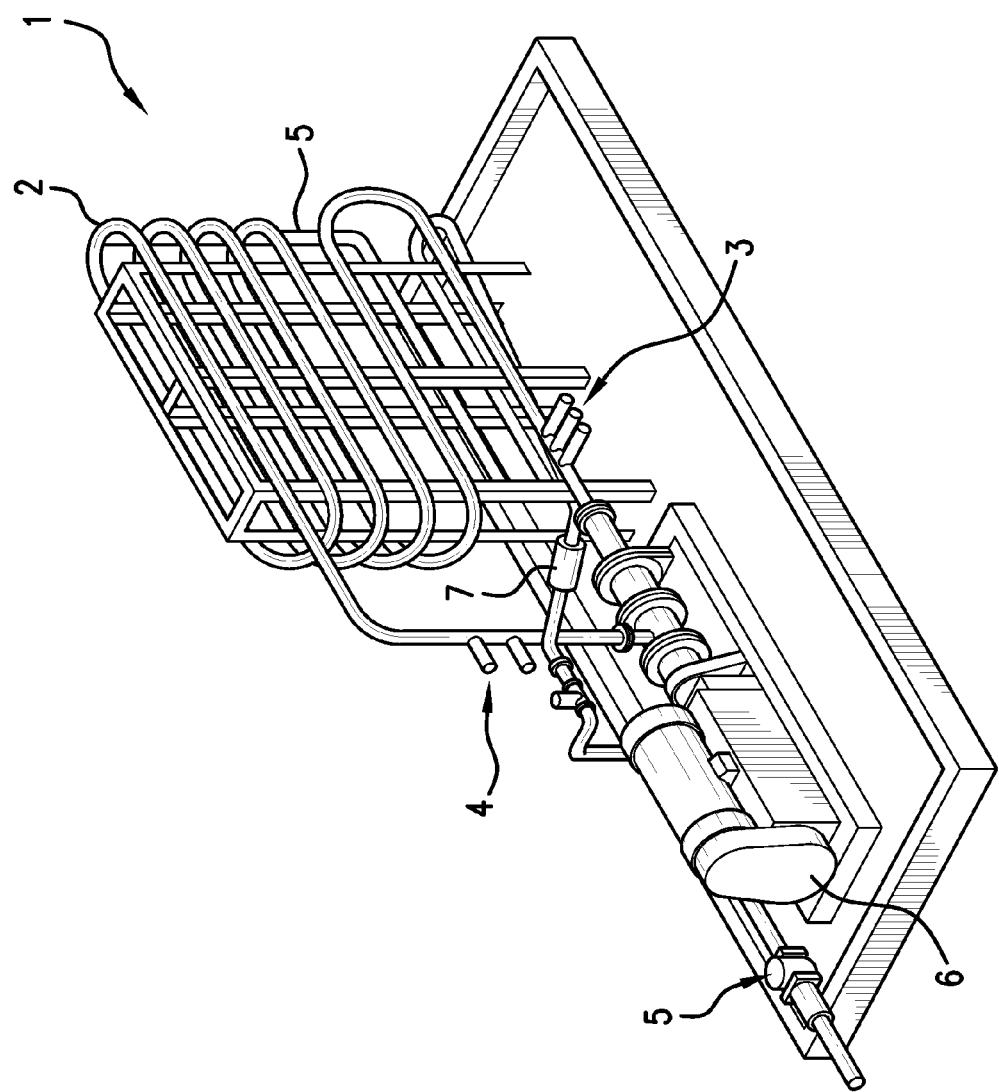

| | | | |
|---|---|---|---|
| 5,890,531 | A | 4/1999 | Gairns et al. |
| 6,391,121 | B1 | 5/2002 | Sivacoe |
| 2001/0022951 | A1* | 9/2001 | Adams et al. ............... 422/132 |

FOREIGN PATENT DOCUMENTS

| | | |
|---|---|---|
| GB | 2 196 716 | 5/1988 |
| WO | WO 99/23438 | 5/1999 |
| WO | WO 00/07717 | 2/2000 |

OTHER PUBLICATIONS

Written Opinion of the International Search Authority, PCT International Patent Application No. PCT/EP2005/055619. Feb. 14, 2007.
International Preliminary Report on Patentability, PCT International Application No. PCT/EP2005/055619, Feb. 14, 2007.
Wilkinson, M., et al., "An Award Winning Process," *Chemistry in Britain*, pp. 1050-1053, Dec. 1993.

* cited by examiner

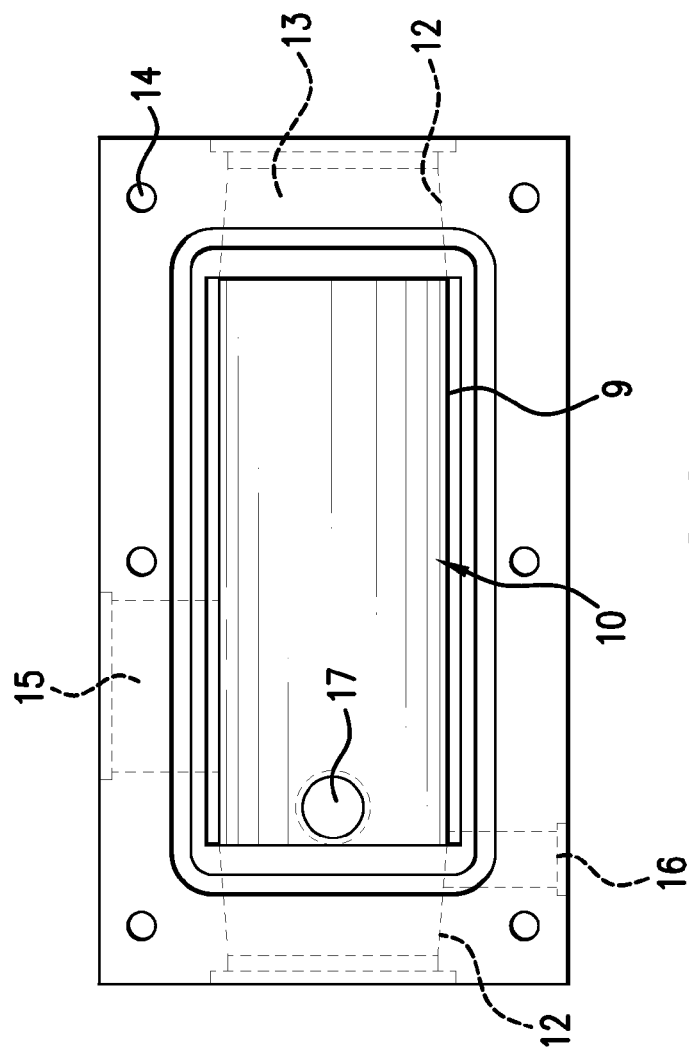
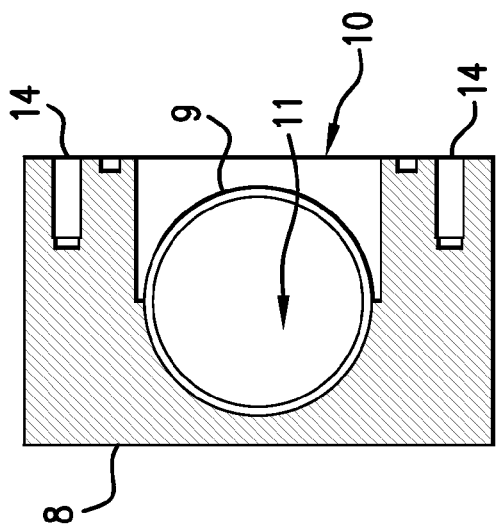

LOOP REACTOR FOR EMULSION POLYMERISATION

The present invention relates to a polymerisation reactor comprising one or more circulation loops with one or more inlets for raw material, one or more outlets, driving means for circulating a reactor charge within the circulation loop, and a pig station for storing, launching, and receiving cleaning pigs.

WO 00/07177 discloses a loop reactor for emulsion polymerisation. The loop reactor comprises a circulation pump and a tubular circulation loop connecting the pump's outlet to its inlet. Water, monomers, and stabilisers are continuously fed to the loop and circulated and polymer emulsion is continuously drawn off. The reactor is particularly suitable for the production of polymers derived from vinyl and/or acrylic monomers, used for instance in paints or adhesives.

A problem encountered in polymerisation processes employing a tubular reactor is the formation of deposits from the reaction products on the internal wall of the reactor. These deposits lead to a need for an increased delivery pressure from the circulation pump and impair heat transfer from the reaction medium to, e.g., a coolant in a jacket surrounding the reactor tube, thus leading to higher and often deleterious reactor temperatures or else necessitating an increased coolant circulation rate, a lower coolant temperature, or a reduced rate of production. Fouling also reduces the reactor volume, increasing both the recycle rate and the shear on the emulsion. This shifts the process conditions, which may have been optimised on a clean reactor. In any case, product properties will drift, nullifying the advantages of consistency of production expected from continuous reactors. In WO 00/07177 cleaning pigs are used for cleaning the inside of the reactor tubes. The cleaning pigs have a diameter which is about the inner diameter of the reactor tube. The pigs are launched from a pig station and propelled through the loop by the polymerising emulsion.

A drawback of this prior art system is that the pigs cannot be easily replaced when they are worn out. A whole section of tubing in which the pig comes to rest, must be removed, resulting in loss of emulsion and soiling of equipment. Further, it is difficult to manufacture a tube section which fits exactly in such a way that only a small force would slide it out when the section is uncoupled to take out the pig and conversely slide it back in after maintenance on the pig. If the tube is fractionally too long it is difficult to remove and replace and if too short there is difficulty in sealing to the other pipes. Moreover, there is a general difficulty in designing a removable tube that does not leak polymer emulsion.

The object of the invention is to provide a pigging station allowing quick and frequent launching of cleaning pigs and easier and faster replacement of cleaning pigs, without spill of emulsion.

The object of the invention is achieved by a tubular reactor with a pig station comprising a lid to cover an opening enabling removal of the cleaning pig. This way, removal and replacement of the pig can be done without interruption of the production process being necessary. To allow easier removal, the opening can be larger then the length of the pigs and have a width which is at least equal to the largest diameter of the pig.

In an optional embodiment, the pig station comprises a box with a cylindrical bore connected at both ends to the circulation loop, the bore having a central part with a diameter which is larger than the inner diameter of the circulation loop. In a transitional part at the outer ends of the bore the bore diameter narrows down to be substantially equal to the inner tube diameter of the circulation loop. The transitional part can be part of the connected tube part or can be a separate part. Preferably, the transitional part is an integral part of the pig station.

Due to the enlarged bore diameter, polymer emulsion in front of the pig can flow backwards around the pig.

In the rest position, the front of the pig is positioned against the bevel of the transitional part joining the larger diameter section in the box to the smaller diameter of the tube forming the circulation loop. Thus the pig is forming a seal at its front end. By virtue of this seal, the pig is forced to move into the circulation loop when water phase is diverted to enter the pig box at a point behind the pig. At the other end of the sequence when the pig is returning, the driving force is provided by polymer emulsion which has been temporarily diverted via the box. Liquid in front of the pig is allowed to move backwards past the pig via the gap provided by the larger diameter of the cavity in the pig box. The volume of emulsion pushing the pig is more than sufficient to move the pig forward even though some of it can pass along the gap. The length of the pig can be adopted such that when the pig has come to a halt, its front end is sealed at the bevel end and the pig is in the correct position for another launch.

Preferably, half of the circular cross-section is formed in the removable lid.

The pig station can be incorporated into a branch of the circulation loop, e.g., in a by-pass line by-passing the driving means. To divert the pig from the main flow of emulsion to the pig station, a diverter can be used. The diverter can be a bar or a pin hingeable between a normal operating position, allowing full bore flow of emulsion, and a diverting position, diverting the pig to the pig station. A suitable example of such a diverter is described in GB-A 2,196,716. The diverter is preferably electronically actuated, e.g., in response to a pig detector located upstream.

The reactor can comprise a shut-off valve behind the pig station to stop the flow of emulsion via the pig by-pass after the pig has returned to its starting position. The reactor can additionally comprise a by-pass line for by-passing reactor charge around the shut-off valve.

Optionally, the inner bore is in open connection with a water phase feed. This allows an easy and fast launch of the pig by water phase. In that case, the reactor can comprise a shut-off valve to stop the water phase feed into the pig box after the pig is launched.

The closed loop reactor can comprise a reactor tube of which at least a substantial part forms a helical coil. In comparison to the common trombone arrangement of the continuous tube (as disclosed in, e.g., M. Wilkinson and K. Geddes, "An award winning process," *Chemistry in Britain*, pp. 1050-1053, December 1993), the shape is more appropriate for pigging in that the pig is not forced to make sharp turns, thus reducing the wear of the pig and allowing the use of longer pigs. Furthermore, uncooled joints, which are one of the origins of wall fouling, can be avoided by using a helically coiled continuous tube.

A pig can be launched at intervals ranging from approximately 1 to approximately 60 minutes, preferably from approximately 10 to 20 minutes. Apart from more effective cleaning of the tube walls, regular disturbance of slow moving or static layers of emulsion polymer close to the tube walls will prevent the onset of a stationary layer of polymer which is a poor heat conductor.

Some typical monomers suitable for use in the present polymerisation process include, e.g., butyl acrylate, methyl methacrylate, styrene, vinyl acetate, Veova® 9, Veova® 10, Veova® 11 (all three ex Shell), ethyl acrylate, 2-ethyl hexyl acrylate, ethylene, and vinyl chloride. The addition reaction is initiated by radicals to give a dispersion of high-molecular weight polymer particles, usually of 50 to 3000 nm diameter, suspended in a medium in which the polymer is insoluble, usually water. Common free radical generators include the sodium, potassium, and ammonium salts of peroxodisulphuric acid, e.g. ammonium peroxodisulphate. Alternatively, redox couples can be used. These consist of an oxidising agent and a reducing agent. Commonly used oxidisers are the salts of peroxodisulphuric acid and t-butyl hydroperoxide and hydrogen peroxide itself. Reducers are sodium sulphite, sodium metabisulphite, sodium formaldehyde sulphoxylate, and sodium dithionate.

Polymerisation of monomers can take place in aqueous suspension and, in that case, raw materials are preferably provided by separate feed streams. These streams introduce fresh monomer and an aqueous solution of stabilisers known as the water phase or, e.g., a pre-emulsion of monomer and water and an aqueous solution in a separate small stream. At the start of the reaction the reactor is filled with water phase made up in a solution tank. Other fillings are also possible, particularly finished emulsion polymer (of the same or different composition) from a previous run, optionally diluted to any concentration.

Agitation in the reactor is provided by virtue of the in-line circulation pump. Shortly after the feed streams start to flow, the monomers begin to react and heat is generated. The temperature is stabilised by cooling means, usually by controlled circulation of a cooling fluid (e.g. water) through a cooling jacket. The product flows to the cooling tank, where residual monomer converts to polymer. After cooling, the emulsion polymer is filtered to remove any oversize particles or gritty material in the strainer and transferred to the product storage tank.

Optionally, the polymerisation process may be carried out under pressure, for instance under a pressure of 10 to 150 bar. Alternatively, the polymerisation may be carried out at ambient pressure.

Pigs can for example be made of soft or semi-hard natural or synthetic material, e.g. rubber or polyurethane. Also, pigs or scrapers with (flexible) metal parts or metal brushes as well as combinations of metal and a soft or semi-hard natural or synthetic material can be used. Of the numerous possible shapes, cylinders, cylinders with round edges as well as cylindrical bodies with thick lips and/or thick strips on the outer circumference are particularly suitable. Dumb-bell shaped cylindrical pigs have two scraping surfaces, as opposed to spherical surfaces, which have only one.

The design of the pig and the materials used depend, among other things, on the type of deposit and the tolerances and radii of the reactor tube. Incidentally, it is noted that the amount of wear of the pig can be determined from the time needed for one cleaning cycle, since a worn pig will require more time to complete a cycle. Suitable circulation pumps are for instance positive displacement pumps.

Figure 4:
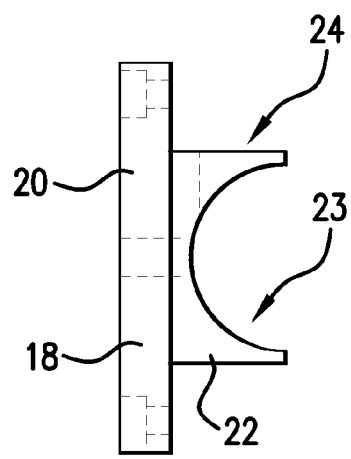
Figure 5:
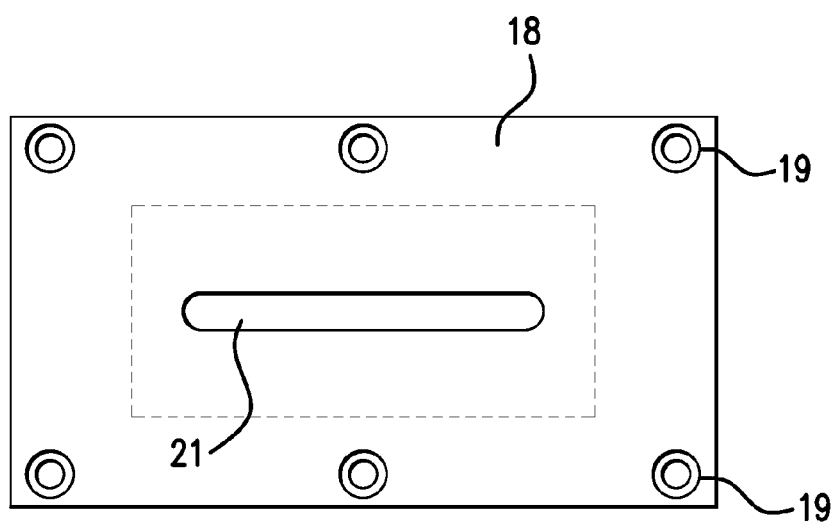
Figure 6:
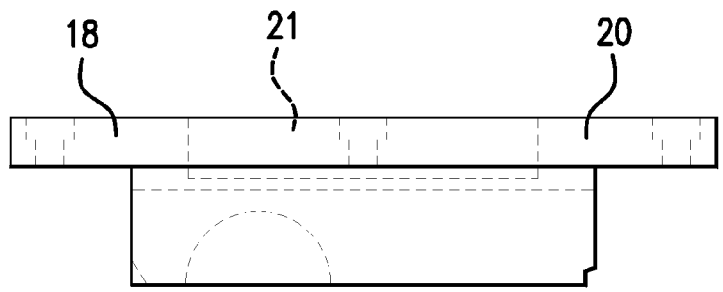
Figure 7:
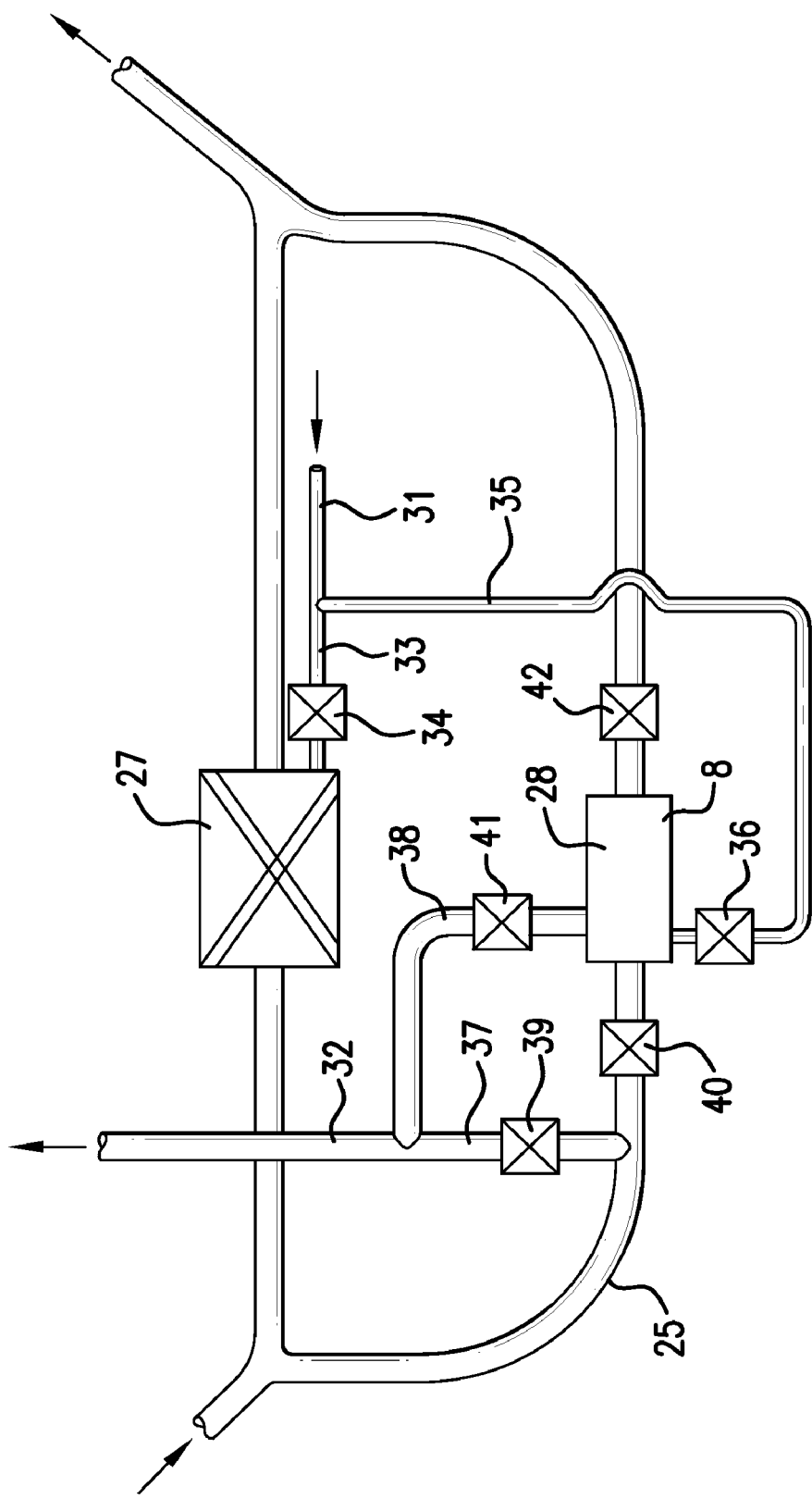
Figure 8:
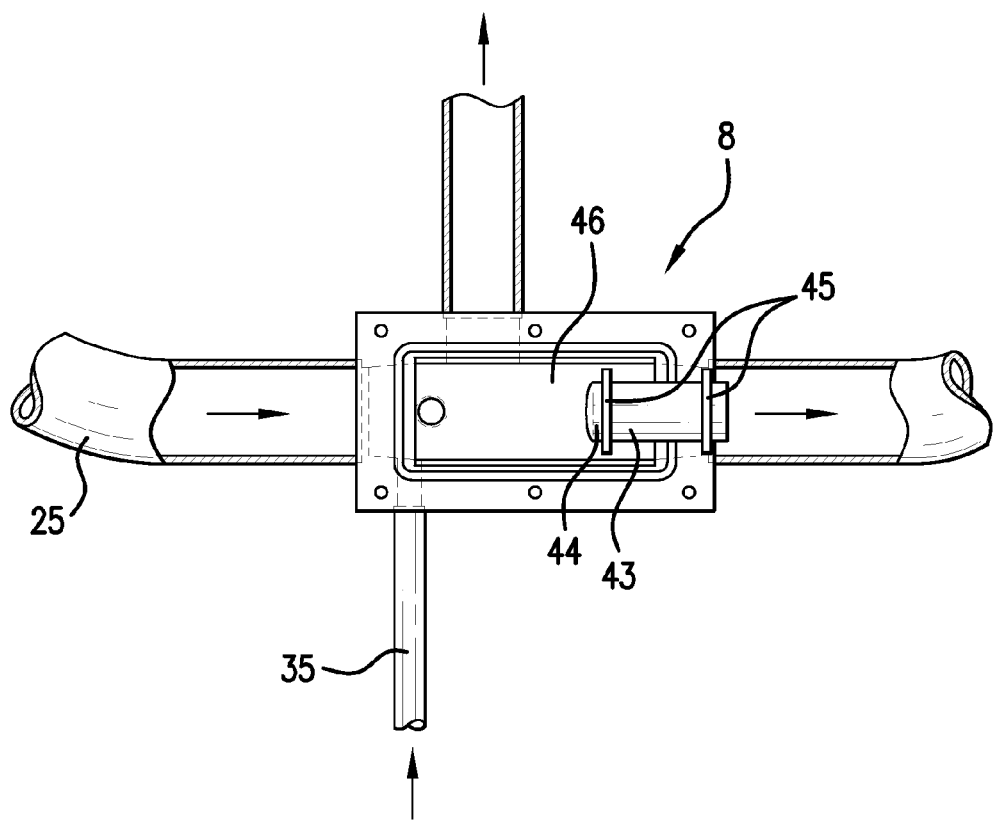

The invention is further illustrated by the drawings. In the drawings:

FIG. 1: shows a loop reactor according to the invention;

FIG. 2: shows a cross-section of the pig box of the loop reactor in FIG. 1;

FIG. 3: shows a plan view of the pig box of the loop reactor in FIG. 1;

FIG. 4: shows a front view of the removable lid for a pig box as shown in FIGS. 2 and 3;

FIG. 5: shows a plan view of the lid of FIG. 4;

FIG. 6: shows a side view of the lid of FIG. 4;

FIG. 7: shows the valve arrangement around the pig box of FIG. 2;

FIG. 8: shows a pig in a pig box, shown in cross section.

FIG. 1 shows a loop reactor 1. The reactor 1 comprises a circulation loop 2 with a monomer inlet 3, a water phase inlet 4, and an outlet 5 for finished product. A circulation pump 6 serves as a driving means for circulating a reactor charge within the circulation loop 2. A by-pass line by-passes the pump 6 and includes a pig station 7 for storing, launching, and receiving cleaning pigs. In stream direction, the monomer feed is located after the pump in order to reduce monomer content, and thus fouling rate, in the pump 6.

The pig station 7 comprises a pig box 8 as shown in cross-section and plan view in FIGS. 2 and 3, respectively. The pig box 8 comprises an inner bore 9 which is circular in cross-section, with a diameter which is slightly larger than the diameter of the used pigs. At its upper end, the box 8 has an opening 10 which can be closed off by a removable lid (see FIG. 4). This opening 10 uncovers a semi-cylindrical recess 11. The opening 10 and recess 11 are bordered by transitional parts 12, having a central bore 13 in register with the recess 11. The inner diameter of bores 13 narrows down to the outer ends to become equal to the inner diameter of the connected loop tube 2.

Threaded holes 14 are provided to engage fastening means for fastening the removable lid. A cylindrical opening 15 is at right angles with the recess 11 and serves to discharge emulsion. Opening 16 serves as a feed for water phase to launch a pig. Opening 16 may alternatively be positioned directly into the pipe leading into the pig box. Opening 17 serves to depressurize the pig box and drain prior to opening the lid.

The opening 10 of the pig box 8 can be closed off with a removable lid 18, as shown in FIGS. 4, 5, and 6. The lid 18 can be fastened with regular fastening means through openings 19, which are in line with the threaded holes 14 in the pig box 8 after the lid 18 is put in place. The lid 18 comprises a top plate 20 provided with a central slot 21, which serves to enable a magnet detector to be positioned closer to the magnets held in the body of the pig. This ensures detection when the pig re-enters the box after the circuit has been completed. At one side of the top plate 20 the lid 18 comprises a block 22 with a semi-cylindrical recess 23. The recess 23 has the same diameter as recess 11 in the pig box 8. When the lid 18 is put in place on the pig box 8, recess 23 and recess 11 form a cylindrical bore. A second semi-cylindrical recess 24 in the lid 18 is at right angles with recess 23. This recess 24 has the same diameter as bore 15 in the pig box 8 and is in line with bore 15 when the lid is placed on the pig box 8. FIG. 7 shows a by-pass line 25 in a loop reactor according to the invention for by-passing cleaning pigs around a circulation pump 27. The by-pass line 25 includes a pig station 28 comprising a pig box 8 with a lid 18 as shown in FIGS. 2-6. The pig station 28 is connected to a water phase feed 31 and an emulsion discharge line 32, which leads to a collection tank (not shown). The water phase feed 31 has a first branch 33, which leads to the circulation pump 27 and is provided with a first shut-off valve 34, and a second branch 35, which leads to the pig station 28 and is provided with a second shut-off valve 36. Near the pig box, the discharge line 32 splits into a first branch 37 connected to the by-pass line 25 at a location which is situated in flow direction before the pig station 28, and a second branch 38 connected to the pig station 28. A third shut-off valve 39 is located in the first branch 37 of the discharge line 32, a fourth shut-off valve 40 is located between the pig station 28 and the location where the first branch is connected to the by-pass line 25. A fifth shut-off valve 41 is located in the second branch 38 of the discharge line, while a sixth shut-off valve 42 is located in the part of the by-pass line 25 which is situated in flow direction past the pig station 28.

In normal use, the shut-off valves 34 and 39 are open, while the valves 36, 40, 41, and 42 are closed. Part of the circulating emulsion is discharged from the loop via the by-pass line 25, valve 39, and the discharge line and collected in the collection tank, while fresh water phase enters the loop via valve 34 and the circulation pump.

To launch the cleaning pig, first valves 42 and 36 are opened. Then valve 34 is closed. The fresh water phase is directed to the back of the pig in the pig box, pushing the pig out of the pig box into the loop coil. An electromagnetic detector, located in the loop just past the by-pass line 25, notes when the pig passes it and initiates the opening of valve 34 and the shutting of valves 36 and 42. The pig goes around the reactor circuit. Where the loop splits into the by-pass line 25 and the line leading to the circulation pump, the loop is internally provided with a diverter pin, which hinges between a first position guiding the pig into the by-pass line, and a second position. The diverter pin is under the control of a second electromagnetic pig detector which is located just before the by-pass line 25. When it detects a passing pig, it causes the diverter to hinge to the first position, guiding the pig into the by-pass line 25. Valves 40 and 41 are opened and valve 39 is closed. This re-routes the emulsion via the pig box. A third electromagnetic pig detector, is located at the pig box and detects the return of the pig, initiating the opening of valve 39 and the closing of valves 40 and 41.

FIG. 8 shows a pig 43 in a pig box 8, in cross section. The pig 43 has a cylindrical body 44 and two rubber ring scrapers 45 with a diameter which is equal to the inner diameter in the loop tubes, in order to completely clean the inner sides of the tubes and remove fouling. The inner diameter of the central cylindrical bore 46, formed by recesses 11 and 22, respectively, is larger than the inner tube diameter. As a result, emulsion can flow backwards past the pig without hindering the pig in taking its starting position.

The invention claimed is:

1. A polymerisation reactor comprising: one or more circulation loops with one or more inlets for raw material, one or more outlets, driving means for circulating a reactor charge within the circulation loop, and a pig station for storing, launching, and receiving cleaning pigs; wherein the pig station comprises a lid to cover an opening, which enables removal of the cleaning pig; wherein the pig station comprises a box with a cylindrical bore connected at both ends to the circulation loop, the bore having a central part with a diameter which is larger than the inner diameter of the circulation loop, and in a transitional part at the outer ends of the bore the bore diameter narrows down to be substantially equal to the inner tube diameter of the circulation loop; and wherein for at least a part of the bore substantially half of the circular cross-section is formed in the removable lid.

2. The reactor according to claim 1, wherein the pig station is incorporated into a by-pass line by-passing the driving means.

3. The reactor according to claim 2, wherein the reactor comprises a shut-off valve behind the pig station.

4. The reactor according to claim 1, wherein the bore is in open connection with a water phase feed.

5. The reactor according to claim 4, wherein the reactor comprises a shut-off valve in the water phase feed of the pig box.

6. The reactor according to claim 1, wherein the transitional part is an integral part of the pig station.

7. The reactor according to claim 4, wherein the reactor comprises a shut-off valve behind the pig station.

8. The reactor according to claim 1, wherein the reactor comprises a shut-off valve behind the pig station.

9. A polymerisation reactor comprising: one or more circulation loops with one or more inlets for raw material, one or more outlets, driving means for circulating a reactor charge within the circulation loop, and a pig station for storing, launching, and receiving cleaning pigs; wherein the pig station comprises a lid to cover an opening, which enables removal of the cleaning pig; wherein the pig station is incorporated into a branch of the circulation loop and wherein the circulation loop comprises a diverter diverting the piq to the pig station; wherein the pig station comprises a box with a cylindrical bore connected at both ends to the circulation loop, the bore having a central part with a diameter which is larger than the inner diameter of the circulation loop, and in a transitional part at the outer ends of the bore the bore diameter narrows down to be substantially equal to the inner tube diameter of the circulation loop; and wherein for at least a part of the bore substantially half of the circular cross-section is formed in the removable lid.

10. The reactor according to claim 9, wherein the reactor comprises a shut-off valve behind the pig station.

11. The reactor according to claim 9, wherein the bore is in open connection with a water phase feed.

12. The reactor according to claim 11, wherein the reactor comprises a shut-off valve in the water phase feed of the pig box.

13. The reactor according to claim 3, wherein the pig box is in open connection with a water phase feed.

14. The reactor according to claim 13, wherein the reactor comprises a shut-off valve in the water phase feed of the pig box.

* * * * *